UNITED STATES PATENT OFFICE.

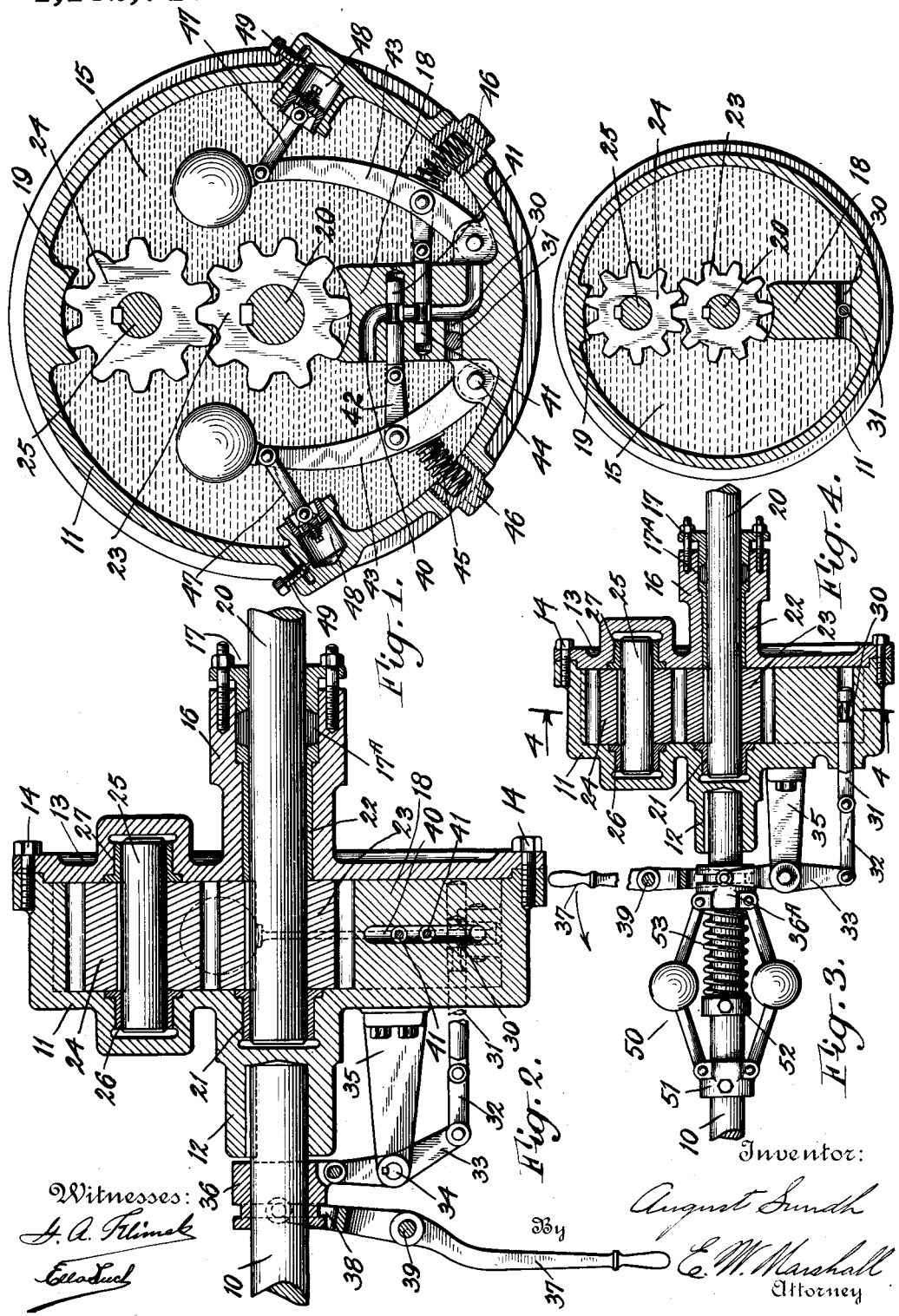

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

AUTOMATIC CLUTCH.

1,132,746.  Specification of Letters Patent.  Patented Mar. 23, 1915.

Application filed December 18, 1909. Serial No. 533,794.

*To all whom it may concern:*

Be it known that I, AUGUST SUNDH, a citizen of the United States, and a resident of the city of Yonkers, in the county of Westchester and State of New York, United States of America, have invented certain new and useful Improvements in Automatic Clutches, of which the following is a specification.

My invention relates to clutches by means of which a rotating member is connected with or disconnected from another member at the will of an operator, and its object is to provide a clutch by means of which this operation may be accomplished smoothly, and which is so arranged that no undue strains may be put upon either the driving or the driven member.

I will describe my invention in the following specification and point out the novel features thereof in the appended claims.

Referring to the drawings, Figure 1 is a sectional end elevation of a clutch made according to my invention. Fig. 2 is a sectional side elevation of the clutch shown in Fig. 1. Fig. 3 shows in sectional side elevation a clutch embodying my invention in a modified form. Fig. 4 is a transverse section of a portion of the apparatus shown in Fig. 3, the section being taken on the line 4—4 of the latter figure, looking in the direction of the arrows.

Like characters of reference designate corresponding parts in all of the figures.

10 designates a driving shaft which is arranged to be rotated by any suitable motive power, such, for example, as that of an internal combustion engine. Mounted upon the end of this shaft is a housing 11, one portion of which is constructed to form a hub-like boss or projection 12 which is keyed to the shaft 10 so that the shaft and the housing rotate together.

13 is a member forming a cover for the housing secured to the latter by some suitable means, such as bolts 14, and arranged to form with the housing a closed receptacle for liquid designated in the drawings by 15. A comparatively heavy lubricating oil is suitable for the purposes of this apparatus. The outer portion of this cover is carried out in the form of an elongated sleeve 16 which surrounds a driven shaft 20. On the end of this sleeve a stuffing-box 17 may be provided.

The driven shaft 20 runs through the oil receptacle and into the housing 11 in which its end is rotatably supported by means of a bearing bushing 21. 22 is another bushing supported within the sleeve 16 and forming a member therein for shaft 20. The outer end of this bushing also forms a part of the stuffing-box as it forms a shoulder against which the packing 17$^A$ is pressed. By this simple arrangement the shafts 10 and 20 are maintained in alinement but are free to have relative or independent rotation.

The inner housing and its cover are designed to form two smooth parallel surfaces fitted between which are a pair of intermeshing gears. One of these, 23, is keyed to the driven shaft 20. The other, 24, is mounted upon a shaft 25 which runs in bearing bushings 26 and 27 supported in the housing 11 and the cover 13, respectively.

18 is a portion of the housing which forms a partition and, with the gears, divides the oil receptacle into two chambers. The inner end of this partition is arranged to fit closely under the teeth of the gear 23. Diametrically opposed to this portion 18 is a portion of the housing 19 which is formed to fit closely over the teeth of gear 24.

In the form of my invention which is illustrated in Figs. 1 and 2 there are two by-passes provided through the partition 18, through which the liquid may circulate from one side of the receptacle to the other. One of these, designated by 30, is controlled by a piston valve 31 which may be manually controlled by means of the mechanism which I will now point out. A link 32 connects this valve with a lever 33 which is pivoted at 34 in a bracket 35 affixed to the housing 11. The other end of lever 33 is connected with a collar or slip-ring 36 loosely mounted upon shaft 10. The forked ends of an operating lever 37 fit into a groove 38 in this slip-ring. The lever 37 is pivoted at a stationary point 39. By this arrangement an operator may open or close by-pass 30 at will whether the clutch is at rest or is rotated. The other by-pass through the partition 18 is designated in the drawings by 40. This by-pass is controlled by two piston valves 41 which are automatically actuated. As these valves and their associated parts are substantially alike, I will describe but one of them. A link 42 connects valve 41 with a weighted governor-arm 43, one end of which is pivoted to the inner portion of housing 11 at 44. A compression spring 45 is arranged to press this governor-arm inward to maintain the valve 41 in its open position when the parts are not rotating above a predetermined rate of speed. This spring fits into a cup-shaped externally threaded member 46 by means of which its compression may be adjusted to regulate or modify the action of the governor-arm. Near the outer or free end of the governor arm is a link 47 which connects this arm with the piston of a dash-pot 48 which is arranged to retard the outward movement of the governor-arm but to allow it to freely move inward. 49 is a threaded adjusting plug by means of which the rate of the outward movement of the dash-pot piston and of the governor-arm may be regulated.

Before describing the other parts of the modified form of my invention which is shown in Figs. 3 and 4, I will describe the operation of the parts which I have already pointed out. When the shaft 10 is rotated, as, for example, by the power of an internal combustion engine, the housing 11 will be rotated with it as I have already shown. As the shaft 20 is now at rest this rotation of the housing will cause the gear 24 to travel about the gear 23 and to rotate. This relative rotation of the gears will cause the liquid 15 to be driven from one of the compartments of the receptacle to the other compartment through the gears and to circulate through the passages provided in the partition 18 by the two by-passes. This circulation may take place freely so that there will be but little if any tendency to impart the rotation of shaft 10 to the shaft 20. Now, if it is desired to have the shaft 20 driven, the operator pulls over lever 37 to close by-pass 30. One path of circulation of the fluid is thus closed, but unless the by-pass 40 is also closed, the liquid may still circulate through the gears and the shaft 20 will remain at rest. If the speed of shaft 10 is sufficient to throw out the governor-arms 43, this by-pass 40 will also be closed. This will stop the circulation of the liquid so that the rotation of the gears 23 and 24 will be stopped. Consequently the shaft 20 will be connected with shaft 10 through these gears and the shafts will rotate together. The advantages of this are obvious. If the driving shaft for any reason is not running at its normal speeds, no additional load can be put upon it through the clutch; or if, while the shaft 20 is being driven, the driving power falls off enough to materially reduce its speed, the governor will open valves 41 and by-pass 40 and will thus throw off the clutch connection. An example of the advantageous use of this device is shown when the shaft 10 is driven by an internal combustion engine and the shaft is a part of the transmission device of an automobile. There will be no load then on the engine when it is started up, even if the clutch lever is thrown over to its connecting position. But as the engine accelerates to its normal speed, the clutch will become operative by the automatic closure of by-pass 40. The effect of the clutch will be gradual so that it will put no sudden strain upon either the engine or the driven mechanism. Moreover, the action of the clutch is within the control of the operator.

In the form of my invention shown in Figs. 3 and 4 the internal mechanism of the clutch is similar to that above described, except that in this case only one by-pass 30 is provided through the partition 18, and the automatically controlled by-pass 40 with its valves and their connected parts are omitted. But I have mounted upon the shaft 10 a fly-ball governor 50 of ordinary design and construction, the arms of which are pivotally connected with a collar 51 affixed to the shaft 10, and to the slip-ring 36$^A$ which, as before, is loosely mounted upon this shaft. 52 is another collar affixed to shaft 10, and 53 is a compression spring between this collar and the slip-ring 36$^A$. This spring has a tendency to maintain valve 31 in its open position, but the governor will close it when shaft 10 attains sufficient speed of rotation to close by-pass 30, stopping the circulation of the liquid and connecting shaft 20 with shaft 10 as before. But the operator may open valve 31 by pulling lever 37 over in the direction indicated by the arrow against the action of the governor.

I have illustrated different forms of my invention to show that I do not limit myself to any specific construction or arrangement of parts.

What I claim is.—

1. A driving shaft, a driven shaft, a clutch mechanism intermediate said shafts arranged to connect the shafts together, said clutch being constructed to form a receptacle for a fluid, rotary fluid impellers within the receptacle arranged to effect a circulation of the said fluid, and comprising automatic means within said receptacle operated from said driving shaft for stopping said circulation when the speed of the driving shaft is above a predetermined rate of speed to thereby cause the rotation of the driving shaft to be transmitted through the clutch to the driven shaft.

2. A driving shaft, a clutch comprising a housing affixed thereto, said housing being constructed to form a receptacle for a fluid, a driven shaft extending into said housing, means carried by the driven shaft for circulating said fluid within the receptacle, and automatic means within said housing actuated by the driving shaft for stopping the circulation of the fluid and thereby causing the shafts to rotate together when the speed of said driving shaft is above a predetermined rate.

3. A driving shaft, a clutch comprising a housing affixed thereto, said housing being constructed to form a receptacle for a fluid, a driven shaft extending into said housing, means carried by said shafts for circulating the fluid within the receptacle when there is a relative rotation between the shafts, manual means for controlling the circulation of the fluid, and automatic means within said housing actuated by the driving shaft for allowing a circulation of the fluid and rendering the clutch inoperative when the speed of rotation of the driving shaft is below a predetermined rate.

4. A driving shaft, a clutch comprising a housing affixed thereto, said housing being constructed to form a receptacle for fluid, a driven shaft extending into said housing, a gear affixed to the driven shaft, a second gear mounted in the housing in mesh with said first gear, said gears being arranged to circulate said fluid within the receptacle when there is a relative rotation between the shafts, manual means for controlling the circulation of said fluid, and a centrifugal governor within said housing actuated by the driving shaft for allowing circulation of the fluid and rendering the driven shaft inoperative when the speed of the driving shaft is below a predetermined rate.

5. A driving shaft, a clutch comprising a housing affixed thereto, said housing being constructed to form a receptacle for a fluid, a partition within said receptacle, a driven shaft extending into said housing, a gear affixed to the driven shaft, a second gear mounted in the housing in mesh with said first gear, said gears with the partition dividing the receptacle into two compartments; said partition being constructed with a by-pass between said compartments, and automatic means within said housing actuated by the driving shaft for closing said by-pass when the speed of the driving shaft is above a predetermined rate.

6. A driving shaft, a clutch comprising a housing affixed thereto, said housing being constructed to form a receptacle for a fluid, a partition within said receptacle, a driven shaft extending into said housing, a gear affixed to the driven shaft, a second gear mounted in the housing in mesh with said first gear, said gears with the partition dividing the receptacle into two compartments; said partition being constructed with a by-pass between said compartments, a valve in said by-pass, and a centrifugal governor within said housing actuated by the driving shaft for closing said by-pass when the speed of the driving shaft is above a predetermined rate.

7. A driving shaft, a clutch comprising a housing affixed thereto, said housing being constructed to form a receptacle for a fluid, a partition within said receptacle, a driven shaft extending into said housing, a gear affixed to the driven shaft, a second gear mounted in the housing in mesh with said first gear, said gears with the partition dividing the receptacle into two compartments; said partition being constructed with a by-pass between said compartments, a valve in said by-pass, a centrifugal governor within said housing actuated by the driving shaft for closing said by-pass when the speed of the driving shaft is above a predetermined rate, and means for adjusting said governor to act at different desired rates of speed.

8. A driving shaft, a clutch comprising a housing affixed thereto, said housing being constructed to form a receptacle for a fluid, a partition within said receptacle, a driven shaft extending into said housing, a gear affixed to the driven shaft, a second gear mounted in the housing in mesh with said first gear, said gears with the partition dividing the receptacle into two compartments; said partition being constructed with two by-passes between said compartments, valves in said by-passes, manual means for controlling one of said valves, and a centrifugal governor within said housing actuated by the driving shaft for actuating the valve in the other by-pass when the speed of the driving shaft is above a predetermined rate.

9. A driving shaft, a clutch comprising a housing affixed thereto, said housing being constructed to form a receptacle for a fluid, a partition within said receptacle, a driven shaft extending into said housing, a gear affixed to the driven shaft, a second gear mounted in the housing in mesh with said first gear, said gears with the partition dividing the receptacle into two compartments; said partition being constructed with two by-passes between said compartments, valves in said by-passes, manual means for controlling one of said valves, a centrifugal governor within said housing actuated by the driving shaft for actuating the valve in the other by-pass when the speed of the driving shaft is above a predetermined rate, means for adjusting said governor to act at different desired rates of speed, and a dashpot connected with the governor arranged to retard its movement in one direction.

10. The combination of a casing, coöperating liquid impellers within the casing and rotatable about parallel axes, a liquid within the casing, means to form a by-pass through which the liquid is circulated, shafts in alinement and secured to the casing and one of said impellers, respectively, and a speed governor within said casing, adapted to restrict the circulation of liquid through said by-pass.

In testimony whereof I have signed my name to this specification in the presence of two subscribing witnesses.

AUGUST SUNDH.

Witnesses:
 ELLA TUCH,
 MARIE L. BRESLIN.